United States Patent
Yan et al.

(10) Patent No.: US 7,921,217 B2
(45) Date of Patent: Apr. 5, 2011

(54) METHOD AND DOWNLOAD AGENT FOR IMPLEMENTING PARALLEL DOWNLOAD

(75) Inventors: Zhefeng Yan, Shenzhen (CN); Haohua Chen, Shenzhen (CN); Fangshan Wang, Shenzhen (CN); Fenglei Wang, Shenzhen (CN); Tieying Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 11/780,363

(22) Filed: Jul. 19, 2007

(65) Prior Publication Data

US 2007/0288484 A1 Dec. 13, 2007

Related U.S. Application Data

(63) Continuation of application No. PCT/CN2006/001809, filed on Jul. 24, 2006.

(30) Foreign Application Priority Data

Aug. 10, 2005 (CN) .......................... 2005 1 0089895

(51) Int. Cl.
  *G06F 15/16* (2006.01)
(52) U.S. Cl. ........................................ 709/229; 709/217
(58) Field of Classification Search ................... 709/219, 709/229, 217; 707/764
  See application file for complete search history.

(56) References Cited

U.S. PATENT DOCUMENTS

| 5,974,461 | A | 10/1999 | Goldman et al. |
| 6,105,029 | A | 8/2000 | Maddalozzo, Jr. et al. |
| 6,339,785 | B1 | 1/2002 | Feigenbaum |
| 6,772,337 | B1 | 8/2004 | Yener |
| 7,165,095 | B2 * | 1/2007 | Sim ................ 709/217 |
| 7,181,523 | B2 * | 2/2007 | Sim ................ 709/226 |
| 7,552,192 | B2 * | 6/2009 | Carmichael ........ 709/217 |
| 7,555,559 | B2 * | 6/2009 | Chapweske ........ 709/232 |
| 7,631,098 | B2 * | 12/2009 | Boutboul et al. ..... 709/238 |

(Continued)

FOREIGN PATENT DOCUMENTS

CN         1399447 A        2/2003

(Continued)

OTHER PUBLICATIONS

State Intellectual Property Office of the People's Republic of China, Examination Report in Chinese Patent Application No. 200510089895.1 (Aug. 31, 2007).

(Continued)

*Primary Examiner* — Krisna Lim
(74) *Attorney, Agent, or Firm* — Leydig, Voit & Mayer, Ltd.

(57) ABSTRACT

A method for implementing parallel download applicable to a system supporting the download of chunked download content includes: acquiring download source information corresponding to download content, wherein the download source information comprises multiple content sources providing the download content, and the multiple content sources corresponds to multiple download servers respectively; dividing the download content into download content chunks according to the download source information; sending a download content chunk request to the multiple download servers corresponding to the multiple content sources respectively, and downloading the download content chunks from the multiple download servers in parallel. A download agent for implementing parallel download is provided. The method and download agent of the embodiments of the present invention may improve the download speed and robustness effectively. Therefore, object files with a large amount of data may be downloaded reliably and rapidly.

10 Claims, 3 Drawing Sheets

U.S. PATENT DOCUMENTS

2006/0031784 A1* 2/2006 Makela .................. 715/850
2008/0104170 A1* 5/2008 Ananthanarayanan ....... 709/204

FOREIGN PATENT DOCUMENTS

| | | | |
|---|---|---|---|
| CN | 1481635 | A | 3/2004 |
| CN | 1499801 | A | 5/2004 |
| CN | 1614931 | A | 5/2005 |
| CN | 1794633 | A | 6/2006 |
| CN | 100411341 | C | 8/2008 |
| KR | 20040085692 | A | 8/2004 |
| WO | WO 02/35799 | A2 | 5/2002 |

OTHER PUBLICATIONS

State Intellectual Property Office of the People's Republic of China, Examination Report in Chinese Patent Application No. 200510089895.1 (Feb. 1, 2008).

European Patent Office, Examination Report in European Patent Application No. 06761544.3 (Jan. 28, 2010).

State Intellectual Property Office of the People's Republic of China, English Translation of Written Opinion of the International Searching Authority in International Patent Application No. PCT/CN2006/001809 (Nov. 9, 2006).

Open Mobile Alliance (OMA), "Download Over the Air Architecture," Draft Version 2.0, Open Mobile Alliance OMA-AD_DLOTA-V2_0-20050329-D (Mar. 29, 2005).

Open Mobile Alliance (OMA), "Download Over-The-Air Requirements," Draft Version 2.0, Open Mobile Alliance OMA-RD_DLOTA-V2_0_10-20041027-D (Oct. 27, 2004).

Open Mobile Alliance (OMA), "Download Over the Air Specification," Draft Version 2.0, Open Mobile Alliance OMA-TS_DLOTA-V2_0-20050713-D (Jul. 13, 2005).

European Patent Office, Supplementary European Search Report for European Patent Application No. 06761544 (Sep. 10, 2008)).

Fielding et al., "Hypertext Transfer Protocol—HTTP/1.1," Network Working Group Internet Standards Track Protocol, Copyright © The Internet Society 1999 (Jun. 1999).

Miu et al., "Performance analysis of a dynamic parallel downloading scheme from mirror sites throughout the internet," 6892 Term Paper, Massachusetts Institute of technology, 1-13 (Dec. 1, 1999).

Open Mobile Alliance, Ltd., "*Generic Content Download Over The Air Specification*", Version 1.0 (Feb. 21, 2003).

* cited by examiner

METHOD AND DOWNLOAD AGENT FOR IMPLEMENTING PARALLEL DOWNLOAD

This application is a continuation of International Patent Application No. PCT/CN2006/001809, filed Jul. 24, 2006, which claims priority to Chinese Patent Application No. 200510089895.1, filed Aug. 10, 2005, all of which are hereby incorporated by reference.

FIELD OF THE INVENTION

The present invention relates to the field of communications, and more particularly, to a method and a download agent for implementing parallel download.

BACKGROUND OF THE INVENTION

Download Over-the-Air (DLOTA), provided by the Browser & Content Download DRM workgroup in the Open Mobile Alliance (OMA), is a specification for the download of data contents in a mobile network. In the specification, a download descriptor is used to provide the information of media objects and download manners and options. A user agent downloads, according to the information in the download descriptor, the media objects through a radio http protocol. A user has to download a download descriptor based on the eXtensible Markup Language (XML) before downloading digital contents. Some attributes are defined in the download descriptor, according to which the user agent carries out download operations, e.g., the user downloads contents according to a Uniform Resources Identifier (URI) through the radio http protocol. The DLOTA provides such functions as capability matching at the user side, timing download, automatic download, resuming interrupted download, sending completion notification after the download process is completed, and so on. According to the functions, a generic method may be adopted to download contents of various types. Moreover, because the XML is used to implement the download descriptor, it is easy to extend the capability of the download descriptor by defining new attributes. In this way, the capabilities of a download agent and a download server may be extended according to new requirements to support new attributes without influencing existing operations.

Two download schemes are defined in the DLOTA specification:

Scheme 1: when downloading content, the user agent sends a download request to multiple download servers at the same time, and receives the content provided by a download server responding to the download request firstly.

Scheme 2: when downloading content, the user agent may send a request for downloading the content in chunk, which may implement pause and resuming of download process.

In Scheme 1, the download content is simplex and the download request may be sent to multiple download servers simultaneously, but the content may be downloaded from only one download server.

In Scheme 2, the pause and resuming of download process may be implemented, but because the download content is downloaded in serial, the total download time is not decreased.

SUMMARY OF THE INVENTION

The embodiments of the present invention provide a method and a download agent for implementing parallel download.

A method for implementing parallel download, applicable to a system supporting the download of chunked download content, includes:

acquiring download source information corresponding to download content, wherein the download source information comprises multiple content sources providing the download content, and the multiple content sources corresponds to multiple download servers respectively;

dividing the download content into download content chunks according to the download source information;

sending a download content chunk request to the multiple download servers corresponding to the multiple content sources respectively, and downloading the download content chunks from the multiple download servers in parallel.

A download agent for implementing parallel download, which is applicable to a terminal, the download agent includes:

a processing unit, configured to analyze download source information, and divide download content into download content chunks according to the download source information;

a requesting unit, configured to acquire the download source information, send the download source information to the processing unit, and download the download content chunks in parallel; wherein the download source information comprises multiple content source providing the download content, and the multiple content sources corresponds to multiple download servers respectively.

The embodiments of the present invention extend download scenarios of the Open Mobile Alliance Download (OMADL), and effectively improve download speed and robustness. Even if one objectURI is in failure, e.g., the download content chunk can not be downloaded from the objectURI or the download speed is slow, other data of the download content chunk may be requested from other objectURIs. Therefore, object files with a large amount of data may be downloaded reliably and rapidly in accordance with the method and terminal of the embodiments of the present invention.

DETAILED DESCRIPTION OF THE INVENTION

The Embodiments of the present invention are hereinafter described in detail with reference to the accompanying drawings.

The download speed may be increased by requesting each part of download content in parallel, which requires that there are multiple content sources (objectURIs) for providing the download content in a download descriptor and download servers corresponding to the objectURIs are able to support the download of the chunked download content.

The download content mentioned in the embodiments of the present invention may be files of various types, e.g., media objects and the like.

Figure 1:
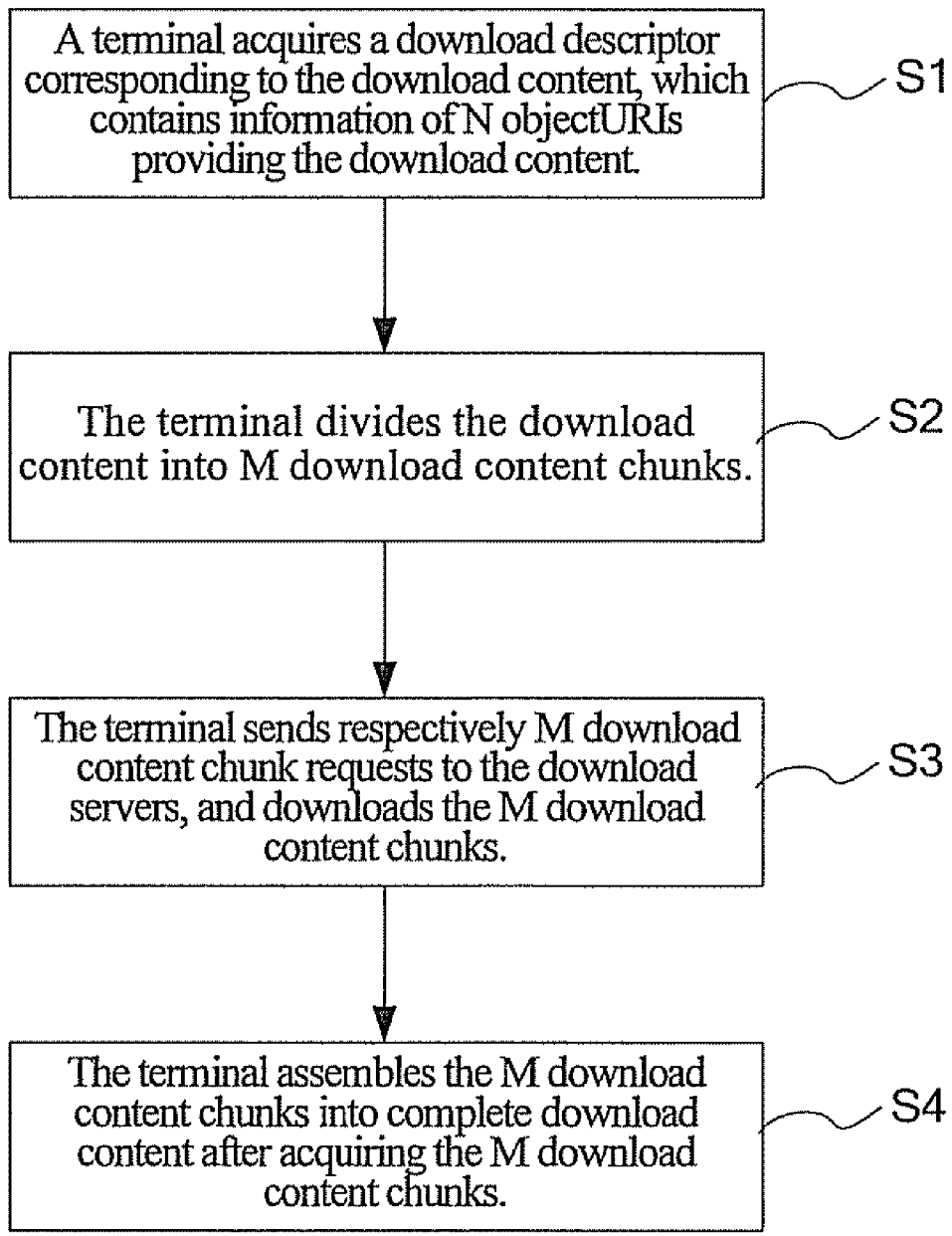
FIG. 1 is a simplified schematic flowchart of download process in accordance with an embodiment of the present invention.

FIG. 1 is a simplified schematic flowchart of download process in accordance with an embodiment of the present invention, which includes:

S1: A terminal acquires a download descriptor corresponding to the download content, which contains information of N objectURIs providing the download content.

To implement the parallel download, the terminal needs to request a download server for the download descriptor of the download content, and acquires the related information of the objectURIs providing the download content.

One download descriptor is shown as the following:

```
<?xml version="1.0" encoding="UTF-8"?>
<media xmlns="http://www.openmobilealliance.org/xmlns/ddv2" >
    <name>whatever.mp3</name>
    <vendor>BMG</vendor>
    <objectURI>http://xxx1.com/mp3/whatever.mp3</objectURI>
    <objectURI>http://xxx2.com/mp3/whatever.mp3</objectURI>
    <objectURI>http://xxx3.com/mp3/whatever.mp3</objectURI>
    <size>4532013</size>
    <type>audio/x-mpeg</type>
    <installNotifyURI>http:/xxx.com/mp3/reports</installNotIfyURI>
</media>
```

Three objectURI attributes are configured for media objects in the download descriptor to inform the terminal that the media objects may be downloaded from the three objectURIs.

Download servers may support the parallel download in chunk through supporting a Range request, which may refer to HTTP 1.1 (RFC2616 http://www.ietf.org/rfc/rfc2616. txt). The download servers designated in the download descriptor should support the Range request, and "accept-range:bytes" is added in a response to a request for the media objects of a download agent to express that the download servers support the Range request.

For example, the terminal sends to a download server a request as the following:

```
GET http://xxx1.com/mp3/whatever.mp3
Host: xxx1.com
Accept: audio/x-mpeg
Range: bytes=0-16383
```

The response to the request from the download server is as the following:

```
HTTP/1.1 206 Partial Content
Server: CoolServer/1.3.12
Content-range: bytes 0-16383/4532013
Content-Type: audio/x-mpeg
Accept-Ranges: bytes
data of whatever.mp3.
```

The response from the download server informs the terminal that the download server may provide a Range function.

S2. The terminal divides the download content into M download content chunks.

After acquiring the download descriptor, the terminal analyzes the download descriptor to acquire the size of the download content. If the size of the download content is large, the parallel download may be used. The download content may be divided into download content chunks in a fixed size (e.g., 16 k), and the last download content chunk may be in a different size.

The download content chunks may be determined in two schemes as the following.

A. The size of each download content chunk is determined firstly, and the size of the download content divided by the size of each download content chunk is the number of download content chunks to be downloaded simultaneously. For example, the size of the download content is 160 k, the size of each download content chunk is set as 30 k. 160 divided by 30 is 6, which means there will be 6 download content chunks to be downloaded simultaneously. The size of each of the former 5 download content chunks is 30 k, and the size of the last download content chunk is 10 k.

B. The number of the download content chunks requested simultaneously (expressed by M) is determined firstly. M is determined according to the number of the download servers and the number of the download content chunks supported by the terminal, and the size of the download content divided by M is the size of the downloaded content chunks. Similar to the scheme A, the size of the last download content chunk is always smaller than or equal to the size of the former download content chunks.

Generally, the download content chunks determined according to scheme A are relatively small, so the probability of successful download by one request is relatively high. The number of the download content chunks is more than the number of the download servers generally. As a result, the download content chunks which have not been downloaded need to be requested continuously after one download content chunk is downloaded completely. It should be noted that, the number of the download content chunks which are being downloaded simultaneously must be less than M. In other words, when M download content chunks are being downloaded, even if there are still "not-requested" download content chunks and idle download servers, a new download content chunk request may not be sent to the idle download servers unless one of the M download content chunks is downloaded completely.

When Scheme B is used to determine the number of the download content chunks, all download content chunks may be downloaded successfully once as long as M download content chunk requests are sent simultaneously and the download content chunks are received successfully. However, the size of the download content chunks is generally large because the number of the download servers in the download descriptor is usually small.

S3: The terminal sends respectively M download content chunk requests to the download servers, and downloads the M download content chunks.

After dividing the download content into the download content chunks, the terminal may request respectively different download servers for downloading these download content chunks. The download content chunks may be downloaded simultaneously, i.e., different parts of the download content are downloaded simultaneously through parallel processing, which saves much time for the terminal.

Each download content chunk needs to be managed during the download procedure, and the download status of each download content chunk may include:

A. not-requested, which means that the download agent has not requested the download server for the data of the download content chunk;

B: downloading, which means that the download agent has requested the download server for the download content chunk, and the download content chunk has been not downloaded completely;

C: completion, which means that the download content chunk has been downloaded completely.

The terminal may maintain a table for recording the download status mentioned above, and the download status of all download content chunks is "not-requested" at the beginning of the download process.

At the beginning of the download process, it may be necessary to determine the number of the download content chunks to be downloaded simultaneously, i.e., M. M may be equal to the number of objectURIs if the number of the objectURIs is relatively small. If the number of the objectURIs is large and the terminal can not simultaneously download from so many objectURIs, M may also be less than the number of the objectURIs. Therefore, M less than the number of the objectURIs may be determined according to the capability of the terminal. A set is used to record all objectURIs used for parallel download, and all objectURIs are in the set at the beginning of the download process. If there is no "accept-range: bytes" in a response of some download server to the download content chunk request, the download server does not support the Range request. As a result, the download process is stopped and the objectURI is removed from the set. When a download content chunk request is sent, an objectURI is randomly selected and removed from the set to be used for the download process. After the download process is completed, the objectURI is moved in the set again. The random selection of the objectURIs may guarantee the load balancing of the download server.

When the download content chunk requests are sent, the prior M download content chunks may be selected simply in an order, the Range requests are respectively sent to M download servers, and the download status of the M download content chunks is changed to "downloading". Of course, other policies may be used to select other download content chunks. After the entire data of one download content chunk is received from a certain download server, the status of the download content chunk is changed to "completion", and a new download content chunk request is sent to the objectURI for a "not-requested" download content chunk. For convenience, the objectURI may be moved in the set, and another objectURI is selected. The number of the download content chunks which are downloading simultaneously should be equal to or less than M at any moment. If one download content chunk requested from some objectURI is not downloaded completely, the rest data of the download content chunk should be requested from the interrupted point at once. If the download content chunk can not be downloaded completely after the objectURIs is requested multiple times, the number of objectURIs used for parallel download minus 1, and another objectURI is removed from the set to be requested. Because the objectURI requested originally is not moved into the set, it can not be requested.

S4: The terminal combines the M download content chunks into complete download content after acquiring the M download content chunks.

The terminal combines the download content chunks locally to form the complete download content after receiving all download content chunks.

The data of the download content chunk may be stored in the terminal in two manners as follows:

A: Pre-allocating a space for storing the download content in the memory according to the size of the download content before downloading; and when receiving the data of a download content chunk, writing the data of the download content chunk in a corresponding location in the space. The implementation of the manner is simple, but has a strict requirement for the size of memory space.

B: Extending a file space dynamically when downloading. If there is a location corresponding to a download content chunk in the file space, directly writing the data of the download content chunk in the location in the file space; otherwise, extending the file space and then writing the data of the download content chunk in the file space. The implementation of the manner is relatively complicated, but doesn't require a lot of memory space. In the manner, if it is found that the memory space is not enough for storing the download content chunk after the capability of device is checked, the terminal should prompt the user that the memory space is in shortage and require the user to confirm whether to download. The user may choose to download, and when the memory space is not enough, the current download process pauses, and the terminal notifies the user of shortage of memory space. The user may resume the download process after deleting some contents to enlarge the memory space.

To support the function of interruption resuming, such information as the size of a download content chunk, the download status list of the download content chunk, the interrupted point of the download content chunk should be made permanent (e.g., stored in a file). The interruption may be resumed directly if corresponding download status information such as user pause, memory shortage pause, network connection interruption, and the like is in the memory, e.g., is reserved in a download agent. If the terminal restarts the download agent because the terminal is power-down, it may be necessary to read the download status information stored recently from the information made permanent. By reading the information made permanent, it can be learnt which download content chunks have been downloaded completely, which download content chunks have not been requested, and which download content chunks have been downloaded partially and where to request the rest data of the download content chunks downloaded partially.

A specific application of the embodiments of the present invention is illustrated with reference to a specific download procedure.

Figure 2:
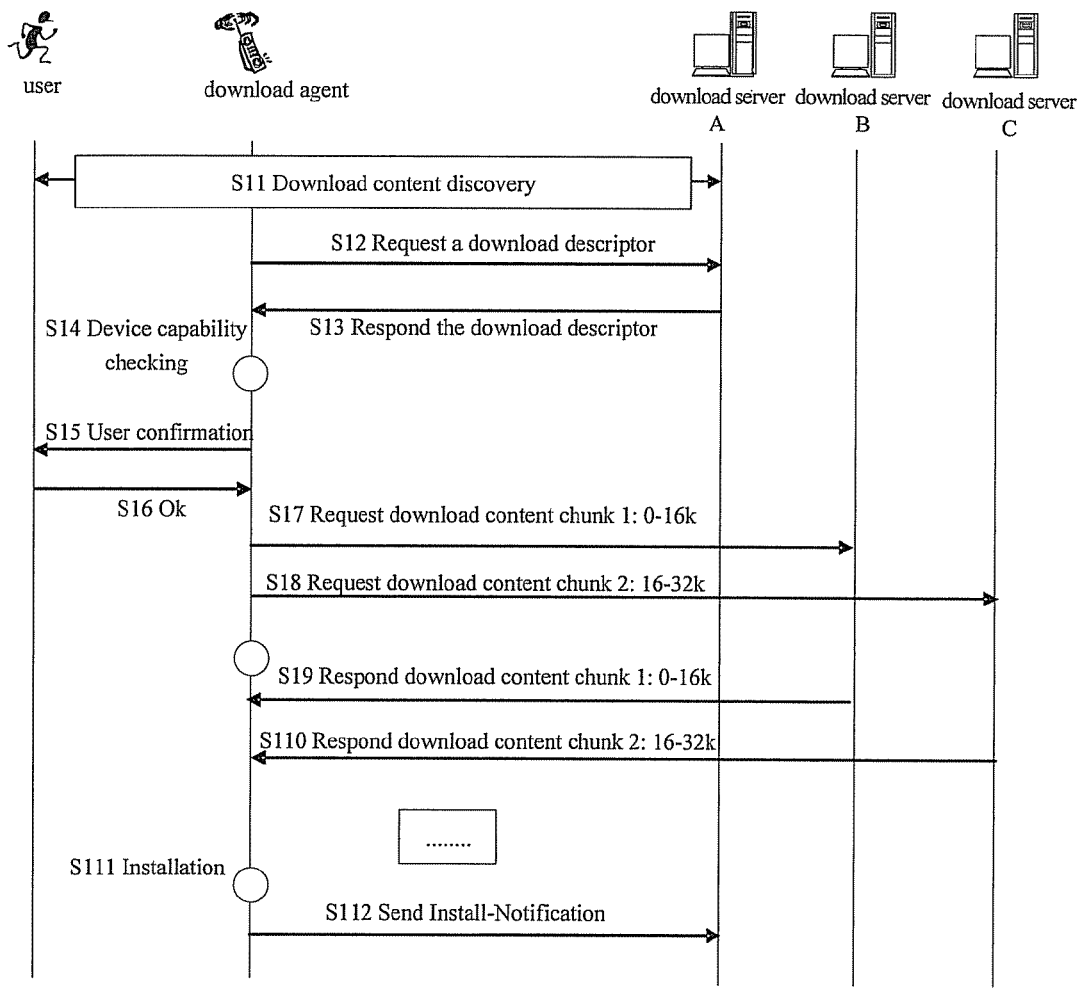
FIG. 2 is a simplified schematic flowchart of implementing parallel download in accordance with an embodiment of the present invention.

FIG. 2 shows a procedure of downloading a media object according to an embodiment of the present invention, which includes:

S11: A user finds a reference to a download descriptor from download server A. The reference may be on a Web page, or inside an email or a multimedia short message, or acquired by any other ways. The download descriptor which the reference points to may be used to download a media object.

S12: A download agent requests download server A for the download descriptor through the reference.

S13: Download server A responds to the request, and returns the download descriptor to the download agent. The download descriptor includes three objectURIs pointing to three copies of the media object on download servers A, B, and C respectively.

S14: The download agent analyzes the download descriptor, and checks the capability of device, such as available memory size, the content type of the media object and so on, to confirm that the terminal is capable of receiving the media object to be downloaded.

S15: The download agent displays for the user related information in the download descriptor, to prompt the user whether to proceed with the download process or not.

S16: The user decides to proceed with the download process.

S17 and S18: The download agent sends a Range request to download server B and download server C respectively to request the 0-16 k data and 16 k-32 k data of the media object.

S19 and S110: The download agent acquires the corresponding data of the media object chunks from download server B and download server C respectively.

In the present embodiment, the number of download content chunks downloaded simultaneously is 2, so the media object is divided into the download content chunks of 16 k, and the download content chunks are requested respectively. As there are three objectURIs, download server B and download server C are selected randomly as the sources requested initially. If there are "not-requested" download content chunks, the data of the "not-requested download content chunks will be requested until the data of all data content chunks are acquired.

S111: The download agent installs the media object.

S112: The download agent reports the status of the download process to download server A, and download server A also acts as a report server in the present embodiment.

Figure 3:
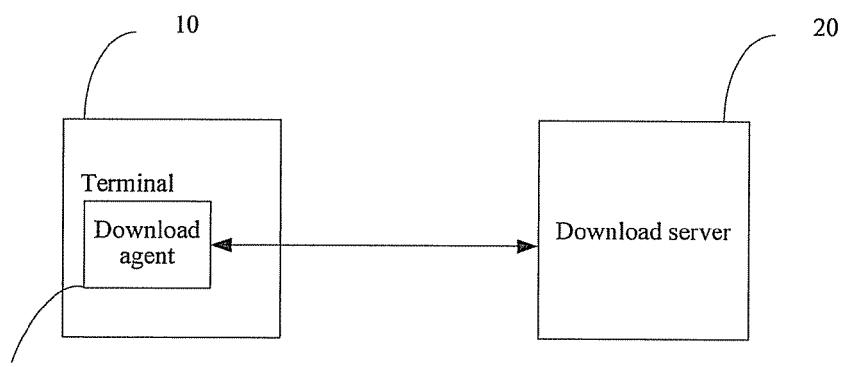
FIG. 3 is a simplified schematic diagram illustrating the structure of a terminal in accordance with an embodiment of the present invention.
Figure 4:
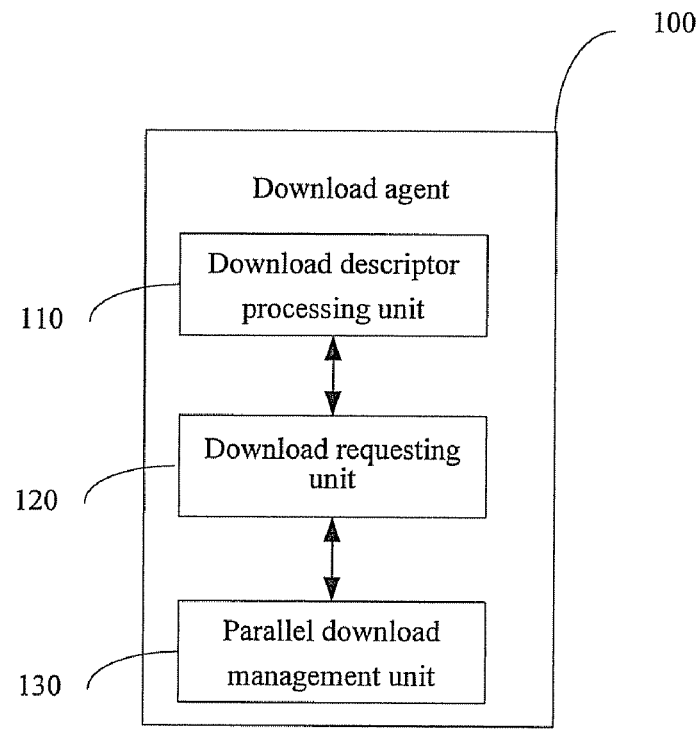
FIG. 4 is a simplified schematic diagram illustrating the structure of a download agent in accordance with an embodiment of the present invention.
Figure 5:
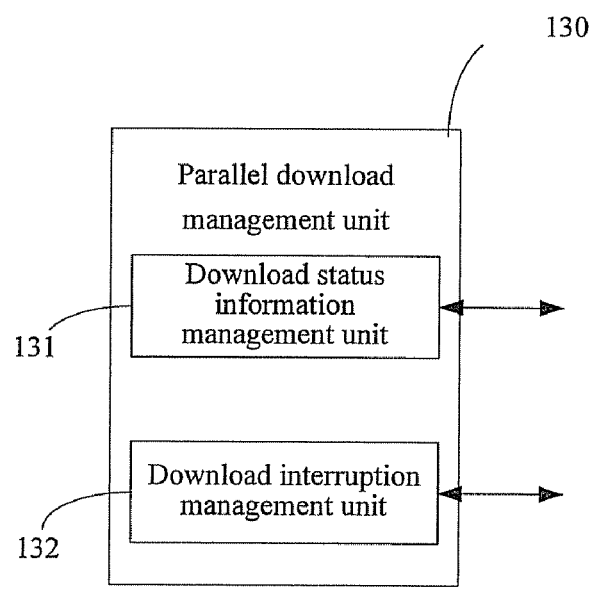
FIG. 5 is a simplified schematic diagram illustrating the structure of a parallel download management unit in accordance with an embodiment of the present invention.

FIGS. 3, 4 and 5 are simplified schematic diagrams illustrating the structure of a terminal in accordance with some embodiments of the present invention. As shown in the figures, the terminal mainly includes the following components.

Download agent 100, for exchanging data with a download server to implement a download function of the terminal, which mainly includes three parts:

Download Descriptor (DD) processing unit 110, for acquiring a download descriptor from a download requesting unit, and analyzing the download descriptor;

download requesting unit 120, for requesting the download descriptor and file chunk data;

parallel download management unit 130, for maintaining and managing the download status information and the interruption information of the file chunks, making the download status information permanent (e.g., storing in a file), acquiring the data of the file chunks from the download requesting unit and writing the data of the file chunks in a file, and reading the download status from the download status information made permanent to resume the download process.

The parallel download management unit 130 includes: a download status information management unit 131, for managing the download status information of download content chunks, and making the download status information of the download content chunks permanent; and a download interruption management unit 132, for managing download interruption information of download content chunks, and making the interruption information of download content chunks permanent.

Because other functional modules such as installing module, installation notification sending module and the like are similar to the specifications of the OMADL, detailed description will not be given herein.

Obviously, those skilled in the art may make numerous changes and variations on the solution of the present invention without departing from the spirit and scope thereof. Accordingly, it is intended that the present invention includes the changes and variations in case that such changes and variations come within the scope as set forth in the appended claims and the equivalent techniques thereof.

What is claimed is:

1. A method for implementing parallel download, applicable to a system supporting the download of chunked download content, the method comprising:

acquiring, by a terminal, download source information corresponding to download content, wherein the download source information comprises multiple content sources providing the download content, and the multiple content sources corresponds to multiple download servers respectively;

dividing, by the terminal, the download content into equal-size download content chunks according to the download source information; and sending, by the terminal, a download content chunk request to the multiple download servers corresponding to the multiple content sources respectively, and downloading the download content chunks from the multiple download servers in parallel;

setting, by the terminal, a set including the multiple content sources; wherein the sending, by the terminal, the download content chunk request to the multiple download servers respectively comprises:

sending, by the terminal, the download content chunk request to the multiple download servers corresponding to the multiple content sources included in the set respectively;

recording and maintaining, by the terminal, download status information of the download content chunks;

deleting, by the terminal, the content source providing a download content chunk from the set, and requesting a download server corresponding to another content source in the set for the download content chunk if the rest data of the download content chunk can not be downloaded completely or times of sending the download content chunk request for the download content chunk exceed a predetermined threshold;

recording and maintaining, by the terminal, download interruption information of the download content chunks; and requesting, by the terminal, downloading the rest data of a download content chunk from an interruption point according to the download interruption information when the download of the download content chunk is interrupted;

wherein download status information of the download content chunks comprises:

not-requested, which means that a download agent has not requested the download server for the data of the download content chunk;

downloading, which means that the download agent has requested the download server for the download content chunk, and the download content chunk has not been downloaded completely; and completion, which means that the download content chunk has been downloaded completely.

2. The method of claim 1, further comprising:

combining, by the terminal, the download content with the download content chunks after the download content chunks are downloaded completely.

3. The method of claim 1, wherein the download source information comprises the size of the download content; and the dividing, by the terminal, the download content into equal-size download content chunks according to the download source information comprises:

determining, by the terminal, the size of the download content chunks;

determining, by the terminal, the number of the download content chunks according to the size of the download content chunks and the size of the download content in the download source information; and dividing, by the terminal, the download content into the equal-size download content chunks according to the number of the download content chunks.

4. The method of claim 1, wherein the download source information comprises the number of the multiple content sources; and the dividing, by the terminal, the download content into equal-size download content chunks according to the download source information comprises:

determining, by the terminal, the number of the download content chunks according to the number of the multiple content sources and the number of the download content chunks supported by a terminal; and dividing, by the terminal, the download content into the equal-size download content chunks according to the number of the download content chunks determined.

5. The method of claim 1, further comprising:

stopping sending, by the terminal, the download content chunk request for a download content chunk to a download server if the download server has no response to the download content chunk request, and removing the content source corresponding to the download server from the set.

6. The method of claim 1, further comprising:

storing, by the terminal, the download content chunks in a reserved storage space or a dynamically extended storage space.

7. A download agent for implementing parallel download, applicable to a terminal, comprising:

a processor, configured to analyze download source information, and divide download content into equal-size download content chunks according to the download source information; and a requesting unit, configured to acquire the download source information, send the download source information to the processor, and download the download content chunks in parallel; wherein the download source information comprises multiple content source providing the download content, and the multiple content sources corresponds to multiple download servers respectively;

a status management unit, configured to record and maintain download status information of the download content chunks; wherein the requesting unit requests, when the rest data of a download content chunk can not be downloaded completely or times of sending the download content chunk request for the download content chunk exceed a predetermined threshold, a download server corresponding to another content source for the download content chunk;

and further comprising:

an interruption management unit, configured to record and maintain download interruption information of the download content chunks; wherein the requesting unit requests rest data of a download content chunk from an interruption point according to the download interruption information when the download of the download content chunk is interrupted;

wherein download status information of the download content chunks comprises:

not-requested, which means that a download agent has not requested the download server for the data of the download content chunk;

downloading, which means that the download agent has requested the download server for the download content chunk, and the download content chunk has not been downloaded completely; and completion, which means that the download content chunk has been downloaded completely.

8. The download agent of claim 7, further comprising:

a download management unit, configured to acquire the download content chunks from the requesting unit, and combining the download content with the download content chunks.

9. The download agent of claim 7, wherein the download source information comprises the size of the download content;

the processor determines the size of the download content chunks, determines the number of the download content chunks according to the size of the download content chunks and the size of the download content in the download source information, and divides the download content into the equal-size download content chunks according to the number of the download content chunks.

10. The download agent of claim 7, wherein the download source information comprises the number of the multiple content sources; the processor determines the number of the download content chunks according to the number of the multiple content sources and the number of the download content chunks supported by a terminal, and divide the download content into the equal-size download content chunks according to the number of the download content chunks determined.

* * * * *